Aug. 8, 1939.  W. H. BRYANT  2,169,137
SLACK ADJUSTER
Filed Dec. 4, 1937  2 Sheets-Sheet 1
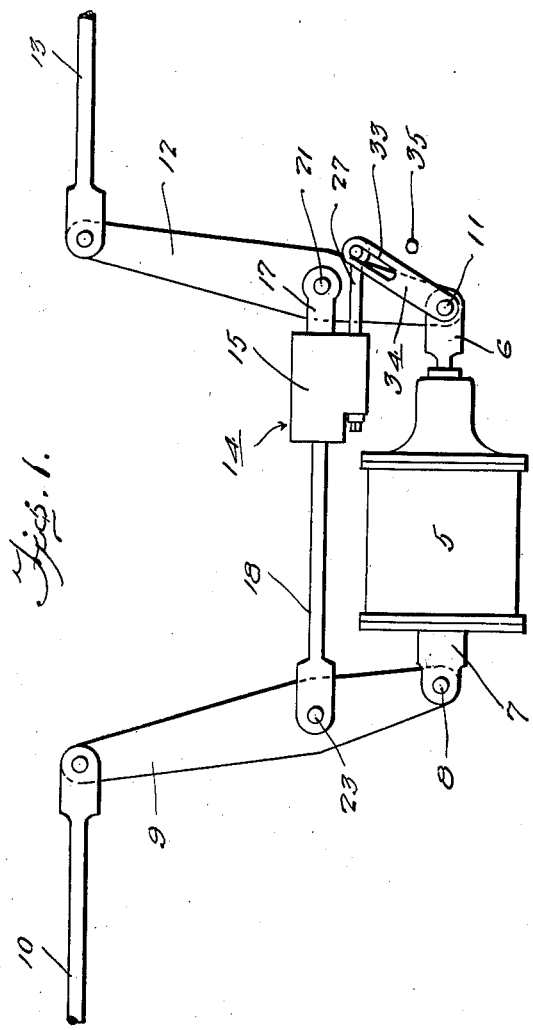
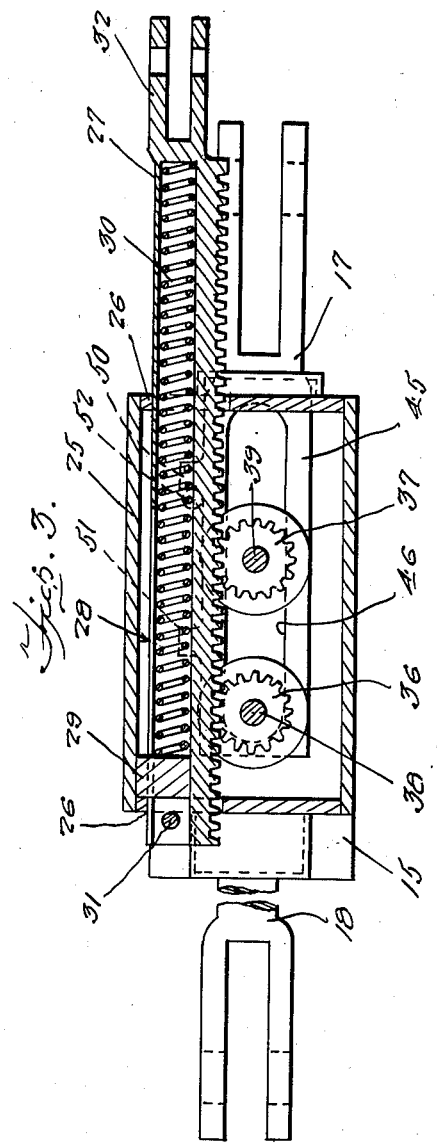
Inventor
W. H. Bryant
By Clarence A. O'Brien
Hyman Berman
Attorneys Aug. 8, 1939.  W. H. BRYANT  2,169,137
SLACK ADJUSTER
Filed Dec. 4 1937  2 Sheets-Sheet 2
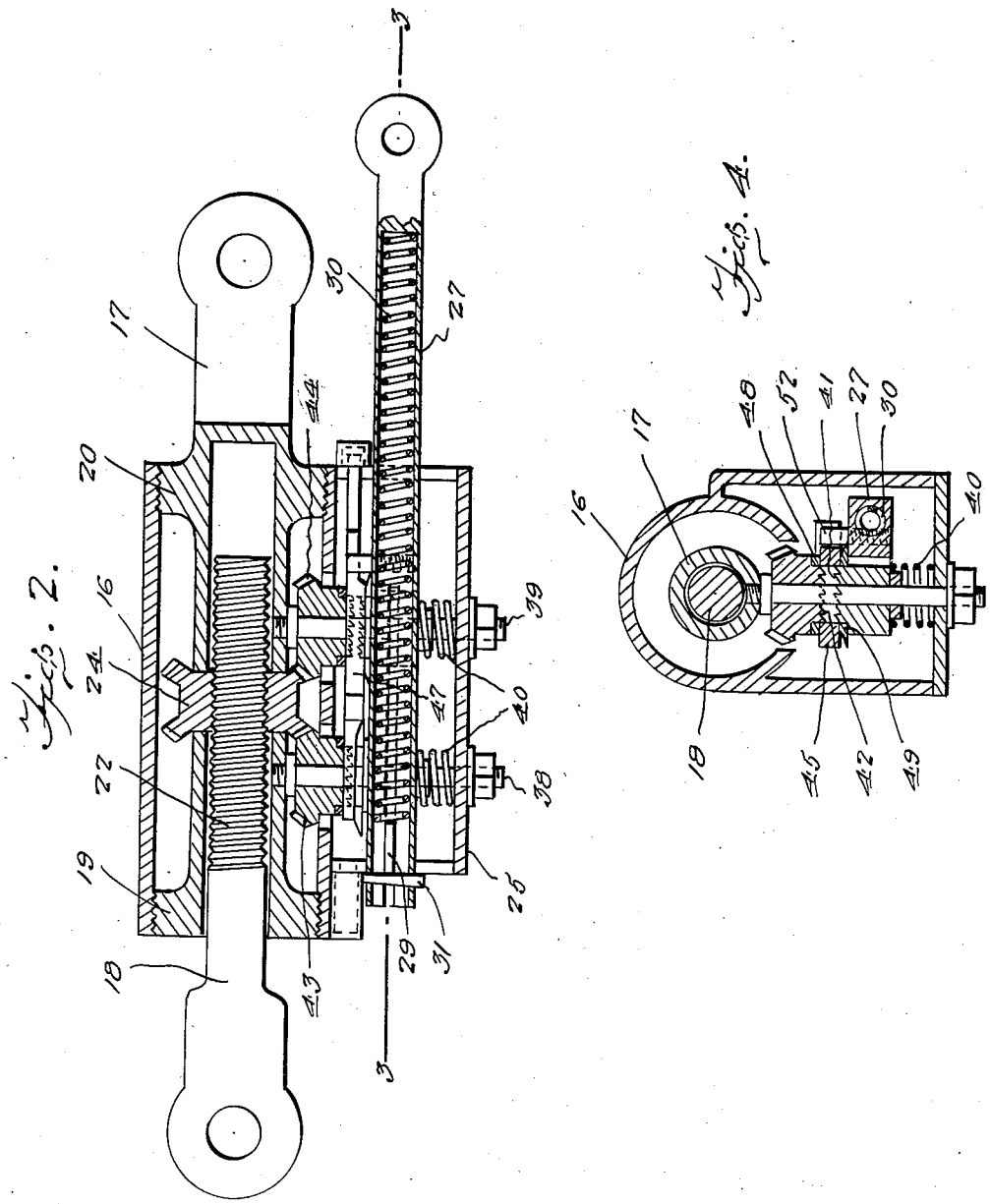
Inventor
W. H. Bryant
By Clarence A. O'Brien
Hyman Berman
Attorneys Patented Aug. 8, 1939

2,169,137

UNITED STATES PATENT OFFICE 2,169,137

SLACK ADJUSTER

Will Henry Bryant, Little Rock, Ark., assignor of fifty per cent to Arthur W. Reed, Little Rock, Ark.

Application December 4, 1937, Serial No. 178,172

2 Claims. (Cl. 188—202)

This invention relates to adjusting devices for taking up and letting out the slack due to the thickness or thinness of brake shoes and an object of the present invention is to provide a device of this character which will operate in conjunction with brakes on locomotives, freight cars, rolling stock cars, motor vehicles, airplanes, and/or other types of vehicles for maintaining the brakes properly adjusted at all times and to eliminate the need of adjusting the brakes by man power at regular intervals as is now required.

The invention together with its objects and advantages will be best understood from a study of the following description taken in connection with the accompanying drawings wherein:

Figure 1 is a side elevational view of the slack adjuster,

Figure 2 is an enlarged detail sectional view through the device,

Figure 3 is a sectional view taken substantially on the line 3—3 of Figure 2, and Figure 4 is a transverse sectional view through the device.

Referring to the drawings by reference numerals it will be seen, reference being had first to Figure 1, that 5 indicates generally a conventional brake cylinder in which operates a piston having a rod the outer end of which is indicated by the reference numeral 6. At one end thereof the cylinder 5 is provided with a lug 7 that is pivoted as at 8 to one end of a lever 9 that is connected through the medium of a link 10 with a brake shoe while the end 6 of the piston rod is pivotally connected as at 11 to one end of a second brake lever 12 that is connected with the other brake shoe of the wheel brake through the medium of a link 13 as is conventional.

The improved slack adjuster is indicated generally by the reference numeral 14 and in the present instance comprises a casting 15. Casting 15 is provided with a substantially cylindrical portion 16 which accommodates a pair of telescoping rods 17, 18. Rod 17 has integral therewith threaded collars 19, 20 which thread within the cylinder 16 at opposite ends of the cylinder as clearly shown in Figure 2. At the free end thereof rod 17 is pivoted to the brake lever 12 as at 21.

Also, the rod 17 is hollow for a major portion of its length to accommodate the threaded section 22 of the aforementioned rod 18 which latter has an outer free end pivoted as at 23 to the brake lever 9. It will thus be seen that the rod 18 is shiftable axially relative to the rod 17 whereby to adjust the brake levers 9 and 12 toward or away from one another as required for a proper adjustment of the brake shoe.

Threaded on the section 22 of the rod 18 is a double bevel gear 24, and to accommodate the gear 24 the rod 17 intermediate the collars 19, 20 is transversely divided into a pair of sections the confronting ends of which are suitably spaced apart and between which is located the aforementioned bevel gear 24 as shown in Figure 2.

The casting 15 is also formed to provide a substantially rectangular boxing or housing 25 and movable lengthwise of the housing 25 through openings 26 provided in the respective opposite ends thereof is an elongated rack bar 27 that is longitudinally slotted as at 28 to accommodate a stop 29 provided therefor within the portion 25 of the casting adjacent one end of said part 25 of the casting as shown in Figure 3.

Housed within the hollow portion of the rack bar 27 is a coil spring 30, one end of which bears against the stop 29 as shown in Figure 3 for normally projecting the rack bar to the position shown in said Figure 3.

Movement of the rack bar 27 to the position shown in Figure 3 is limited through the medium of a stop pin 31 that is adapted to abut that end of the part 25 of the casting in which is located the fixed stop 29. (See Figures 2 and 3).

The free end 32 of the rack bar 27 has a pin and slot, or in other words any suitable lost motion connection 33 with a lever 34 which latter, through the medium of the aforementioned pivot 11, is pivotally connected to the piston rod end 6.

Arranged in the path of the lever 34 and suitably mounted in fixed position relative to the lever 34 is a stop element 35 as shown in Figure 1. Thus it will be seen that as the piston within the cylinder 5 moves towards the right in Figure 1 incidental to an application of the brake, lever 34 will move into engagement with the stop 35, and as the piston rod 6 continues movement in the direction just indicated lever 34 will be caused to rotate towards the left in Figure 1 or in a counter-clockwise direction thus moving the rack bar 27 inwardly against the action of coil spring 30.

The rack bar 27 is in constant mesh with gears 36, 37 which are mounted loosely on shafts 38, 39 and are movable axially on said shafts.

Bearing against the undersides of the gears 36, 37 are coil springs 40 and on the top side thereof the gears 36, 37 are provided with clutch elements in the form of ratchet teeth 41 complemental to clutch elements, in the form of ratchet teeth 42 provided on companion, bevel gears 43, 44 which are also mounted on the shafts 38, 39.

A clutch operating slide, indicated by the reference numeral 45, is provided with an elongated slot 46 to accommodate, as shown in Figures 3 and 4, the clutch-equipped ends of gears 36, 37, 43, 44. Intermediate its ends the clutch 5 is materially thickened as at 47 for cooperation with shoulders 48, 49; shoulders 48 being provided on the upper gears 43, 44, and shoulders 49 being provided on the lower gears 36, 37. Gears 36 and 43 are normally engaged when the brakes are in released position. When the brakes are applied gears 36 and 43 remain engaged until push rod 6 travels nominally seven inches. When the travel of push rod 6 exceeds seven inches slide 45 engages the shoulders of gears 36 and 43 and separates such gears. Gears 37 and 44 are normally disengaged when the brakes are in released position. When the brakes are applied and the push rod 6 exceeds in its travel nominally 8½ inches the thickened portion 37 of slide 45 moves out of engagement with the shoulders of gears 37 and 44 permitting the clutch elements of these two gears to engage.

For transmitting movement of the rack bar 27 to the clutch operating slide 45 the latter is provided on one side edge thereof with a pair of spaced apart shoulders or lugs 50, 51 between which operates a pin 52 carried by the rack bar 27 so that when the pin 52 is engaged with either one of the lugs 50, 51 movement of the rack bar will be transmitted to the slide 45.

The utility, advantages and operation of the device will be understood from the following:

Let it be assumed that the brake levers 9 and 12 and the slack adjusting device 14 are so set that when the piston rod, or as may be otherwise termed, the brake cylinder push rod 6 travels between seven inches and eight and one-half inches the brakes will be properly applied. Under such circumstances the brake cylinder push rod 6 will travel three and one-half inches before the lever 34 comes into contact with stop 35. Thus any travel of the push rod 6 in excess of three and one-half inches will bring the lever 34 into contact with the stop 35 thus causing the rack 27 to move inwardly against the action of spring 30.

As is apparent the spacing of the lugs 50, 51 on the slide 45 is such that pin 52 will travel freely therebetween. Should however the push rod 6 travel less than seven inches pin 52 will not have reached the lug 51 and consequently the travel of the rack bar 27 has resulted in a rotating of the gear 37 which, at this time, is disengaged from its companion gear 44, and said rack bar has turned the gear 36 which is in mesh with its complemental gear 43, causing the latter gear to rotate in a counter-clockwise direction (Figure 2). Manifestly, upon release of the push rod 6 spring 30 will act to push the rack bar 27 outwardly causing gears 36 and 43, engaged, to rotate, driving the gear 24 in a direction to unscrew the rod 18 causing the latter to move outwardly relative to the rod 17 thus increasing the distance between the pivot points 21, 23. Consequently, and as is apparent, if the push rod 6 does not travel as much as seven inches rod 18 will automatically screw outwardly resulting in a change in the leverage of the brake rods 9 and 12 so that a travel of at least seven inches will be had for the push rod 6.

When the push rod 6 travels a distance approximating seven inches the pin 52 will just be in contact with the lug 51. Consequently, as the travel of the push rod 6 exceeds seven inches and less than eight and a half inches, the pin 52 will engage the lug 51 causing the clutch slide 45 to move inwardly sufficiently to free the gears 36 and 43, still maintaining the gears 37 and 44 disengaged, so that the brakes may have normal braking action without any adjustment to the brake rigging thereof. However, when the push rod travels more than eight and a half inches, the pin 52 engages the lug 51 and moves the clutch slide 45 a sufficient distance to bring about engagement of the clutch elements of the gears 37 and 44 connecting the latter-named gears so that when the rack bar moves to the right under the action of the spring and on the release of the brakes, the gear 24 will be rotated to feed the rod 18 towards the rod 17 to shorten the distance between the levers 9 and 12 and thereby bring about an adjustment of the brake rigging to where the travel of the push rod will be between seven and eight and a half inches as desired for the proper operation of the brakes. Thus it will be seen that a brake adjuster has been provided which will automatically maintain the brake rigging adjusted so that the push rod 6 may travel its proper seven to eight and a half inches for the proper application of the brakes and should the movement of the push rod vary from seven to eight and a half inches, the adjuster automatically brings about adjustment of the brake rigging so that the brakes will be in proper adjustment at all times to provide the maximum braking action.

As brake shoes on locomotive tenders, motor vehicles and the like, wear, naturally more travel will be required of the brake cylinder push rod 6 in order to apply the brake. Thus it will be seen from the above that the slack adjuster device of the present invention is so designed and set as to limit the travel of the piston or push rod 6 between seven inches and eight and one-half inches. Consequently, any travel less than seven inches will cause the rod 18 to unscrew or move outwardly thus altering the brake leverage so that the piston or push rod 6 will be permitted to travel a distance of at least seven inches when the brakes are properly applied. Any travel of the push rod 6 in excess of eight and one-half inches would cause the rod 18 to screw inwardly thus altering the brake leverage so that the push rod 6 will gradually be brought back to a maximum of eight and one-half inches when the brakes are properly applied.

The distance of travel for the brake rod 6 as above given is of course arbitrary and has been taken as a standard merely for the reason that at the present time, and in accordance with Government ruling, the maximum travel of the push rod on locomotive tenders is nine inches. Thus with a device of this character the travel of the push rod 6 will be confined to proper limits at all times.

Further it will be appreciated that the device of this invention can be so set as to limit the push rod travel between any minimum and maximum dimensions desired and that with this device the brakes will always set between these dimensions.

It is thought that a clear understanding of the construction, utility and advantages of an invention of this character will be had without a more detailed description.

Having thus described the invention what is claimed as new is:

1. In a slack adjuster for a vehicular brake, the combination with a brake cylinder push rod, and a pair of brake levers, one of which levers is pivoted at one end thereof to the brake cylinder and the other of which levers is pivoted at one end thereof to the push rod, a slack adjusted including a pair of telescoping rods one of which is pivoted at one end to one of said brake levers, and the other of which is provided at one end to the other of said brake levers, means connected with said telescoping rods for longitudinally adjusting said rods relative to one another, and a mechanism for operating said rod adjusting means including a rack bar, a spring device normally urging the rack bar in one direction, means operatively connecting said rack bar with the brake cylinder push rod, means for transmitting movement of the rack bar to said rod adjusting means, and a clutch device operatively connected with the rack bar and operating in response to the movement of the rack bar for controlling the transmission of drive from the rack bar to said rod adjusting means.

2. A brake adjuster comprising a casting having a substantially tubular shaped portion, telescopic rods extending into said tubular portion and one of said rods secured on said portion against movement, screw threads formed on the other rod, said rods being pivotally connected to pivotally mounted levers of a brake rigging, a double gear meshing with the screw threads on one of said rods for adjusting the latter relative to the non-movable rod by the rotation thereof, a spring influenced rack bar slidably supported by said casting, means for connecting said rack bar to a piston stem of a brake operating cylinder with a selected amount of play to permit a given amount of movement of the piston stem before imparting movement to said rack bar, gears journaled in said casting and meshing with the double gear, gears meshing with the rack bar and mounted in the casting, ratchet type clutches for connecting and disconnecting said first and second-named gears, and a clutch operating means for effecting operation of the clutches by the sliding movement of the rack bar to adjust the brake rigging either when the distance of travel of the piston stem exceeds a predetermined distance or when it fails to travel the predetermined distance.

WILL HENRY BRYANT.